US008988356B2

(12) United States Patent
Tseng

(10) Patent No.: US 8,988,356 B2
(45) Date of Patent: Mar. 24, 2015

(54) TOUCH SENSOR AND TOUCHSCREEN USER INPUT COMBINATION

(75) Inventor: Erick Tseng, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1227 days.

(21) Appl. No.: 12/651,143

(22) Filed: Dec. 31, 2009

(65) Prior Publication Data

US 2011/0157029 A1 Jun. 30, 2011

(51) Int. Cl.
G06F 3/041 (2006.01)
G06F 3/0488 (2013.01)

(52) U.S. Cl.
CPC .................................. G06F 3/04883 (2013.01)
USPC ........................................................ 345/172

(58) Field of Classification Search
CPC ................................................... G06F 3/04883
USPC .......................................... 345/156, 172–174
See application file for complete search history.

(56) References Cited

U.S. PATENT DOCUMENTS

2001/0042262 A1* 11/2001 Chu .................................. 2/246
2005/0052426 A1 3/2005 Hagermoser et al.
2006/0146038 A1* 7/2006 Park et al. ...................... 345/173
2006/0197750 A1* 9/2006 Kerr et al. ...................... 345/173
2007/0091070 A1 4/2007 Larsen et al.
2007/0279397 A1* 12/2007 Cho et al. ....................... 345/173
2007/0291009 A1* 12/2007 Wright et al. ................. 345/173
2009/0085889 A1 4/2009 Hyeon
2009/0109190 A1 4/2009 Elias
2009/0153288 A1* 6/2009 Hope et al. ...................... 340/3.1
2009/0225042 A1* 9/2009 Andrews et al. .............. 345/173
2009/0264157 A1* 10/2009 Hsieh et al. .................... 455/566
2009/0278806 A1 11/2009 Duarte et al.

OTHER PUBLICATIONS

Duncan, Judy, "Rubik's Touch Cube" [online], published on Feb. 23, 2009, retrieved on Mar. 10, 2010, 3 pages. Retrieved from the internet: http://thefutureofthings.com/pod/6505/rubik-s-touch-cube.html.
International Search Report & Written Opinion for Application No. PCT/US2010/062524, dated Mar. 22, 2011, 11 pages.
International Preliminary Report on Patentability for Application No. PCT/US2010/062524, dated Jul. 12, 2012, 9 pages.
Examination Report; Australia; Examiner; Publication Mailed; Dec. 17, 2013; 2010339401; 3 pages.

* cited by examiner

Primary Examiner — Quan-Zhen Wang
Assistant Examiner — Tony Davis
(74) Attorney, Agent, or Firm — Fish & Richardson P.C.

(57) ABSTRACT

In general, the subject matter described in this specification can be embodied in methods, systems, and program products. A swiping action between a touch sensor and a touchscreen of a computing device is identified. The identification includes determining, while the computing device is in a state that provides a first graphical display, that the touch sensor has been physically contacted by a user. The identification includes determining that the physical contact with the touch sensor has ended. The identification includes determining, within a predetermined time period of the end of the physical contact, that a dragging motion across the touchscreen has originated at a peripheral edge of the touchscreen. In response to the identifying, a predetermined computerized routine is invoked that replaces the first graphical display with a second graphical display, wherein user interaction with the touch sensor or touchscreen individually do not invoke the predetermined computerized routine.

19 Claims, 9 Drawing Sheets

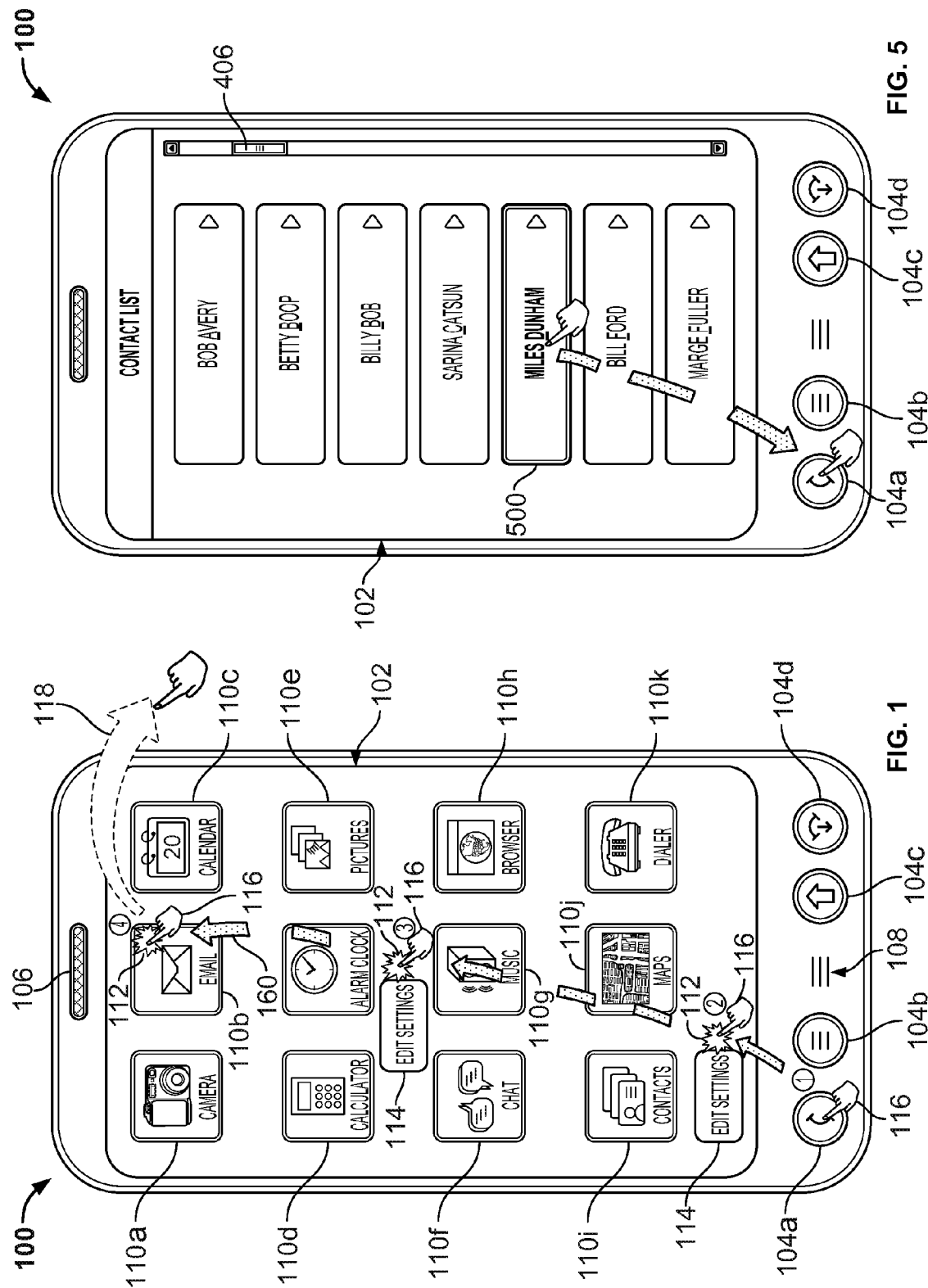

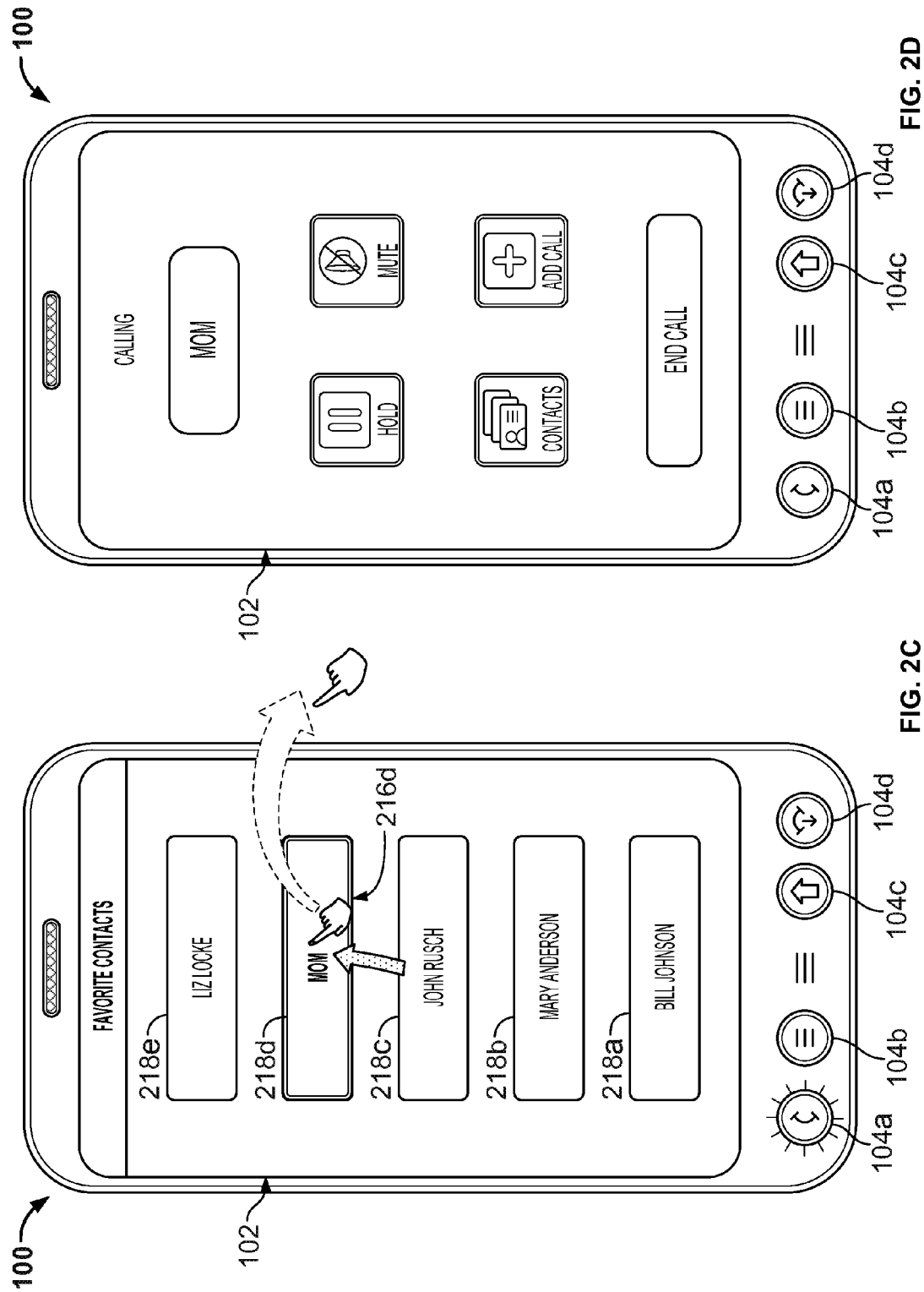

TOUCH SENSOR AND TOUCHSCREEN USER INPUT COMBINATION

TECHNICAL FIELD

This document generally describes techniques, methods, systems, and mechanisms for identifying touch sensor and touchscreen user input combinations.

BACKGROUND

The present disclosure generally relates to user interaction with computing devices. Mobile computing devices such as smartphones have become abundant and touchscreen displays are now used in place of many of the individual user input components previously found on smartphones. For example, some mobile telephones no longer include a physical keypad for the digits 0-9. Instead, a representation of the keypad (a "virtual" keypad) is displayed on a touchscreen. A user dials a number by pressing regions of the touchscreen that correspond to each displayed digit. Use of a touchscreen to receive user input enables different forms of user input to invoke different actions, depending on an invoked application. Still, mobile telephones may include buttons or touch sensors for receiving user input separately from the touchscreen. These other user input components sometimes share the face of the telephone with the touchscreen, limiting the size of touchscreen to an area smaller than the entire telephone face.

SUMMARY

This document describes techniques, methods, systems, and mechanisms for coordinating touch sensor and touchscreen user input combinations. In general, a computing device may include a touchscreen and several touch sensors (which are generally much less expensive than a comparable touchscreen) arranged adjacent to the touchscreen on a face of the computing device. A user can invoke the execution of a predetermined operation on the computing device by swiping his finger or a stylus across one of the inexpensive sensors and onto the touchscreen. The device may interpret the combination of a sensor contact and a touchscreen contact and/or touchscreen dragging action in close time proximity as a particular type of intended input from the user. The invoked function may be a "secondary" function that is not invoked through manipulation of the touch sensor or touchscreen alone. Similarly, the user can invoke the same or a different secondary function by swiping his finger or a stylus from the touchscreen and onto the touch sensor. Such a swipe by a user from a touch sensor and onto a touchscreen is hereinafter referred to as a "twin-swiping input" (or conversely a swipe by a user from a touchscreen and onto a touch sensor). Dragging across the surface of the touchscreen independent of interaction with a touch sensor is referred to as "touchscreen swiping."

As an illustration, some mobile telephones include a touchscreen as the primary user input component. The same user contact with the touchscreen may invoke different commands on the telephone, depending on a state of the telephone (e.g., the application that is invoked or whether the telephone is docked). For example, in a telephone dialing application, a telephone number may be dialed by tapping portions of the touchscreen that correspond to displayed keypad buttons. In a drawing application, a user may squiggle his finger or a stylus across the touchscreen to draw lines or size a region for selection.

Despite the variety of user-input functions that a touchscreen can provide, a mobile telephone may include touch sensors located proximate to the telephone's touchscreen. A user may invoke predetermined functions by applying pressure or otherwise contacting such touch sensors. The predetermined functions may be chosen by the user as the functions that are the most commonly used. In some examples, the function invoked by contacting a touch sensor is the same regardless of an invoked application. For example, an invoked function may be application independent so a command associated with user contact with a touch sensor overrides an operation of an invoked application. Example functions that may be invoked by contacting touch sensors include "answer call," "end call," "display menu," and "go to home screen."

A user swiping from the touch sensor and onto the touchscreen may invoke an action that is different than actions that may be invoked by manipulating the touch sensor or touchscreen independently. As an illustration, if a mobile telephone has invoked a music player application and a user swipes his finger from a touch sensor with an overlaying visual indicia of a green telephone handset to the touchscreen, a list of the user's "Favorite" telephone contacts may replace the display associated with the music player.

On the other hand, with the music player's graphical interface displayed on the touchscreen, a user of the mobile telephone may be able to use the touchscreen to pause the song, toggle to the next or previous songs, or change the volume (e.g., with tapping or touchscreen swiping actions). The user may be unable to use the touchscreen to view a list of the favorite contacts unless the user performs a series of touchscreen user inputs to leave the music player application, open the contact book, and filter the contact book to a list of the favorite contacts. Similarly, if the user contacts the touch sensor, the telephone may initiate a call with the last person dialed but not display a list of the user's favorite contacts.

Allowing the user to access his list of favorite contacts using a twin-swiping input can be beneficial. Designing the telephone to include an additional touch sensor to specifically invoke a display of the favorite contacts may require that the touchscreen be reduced. Thus, utilizing the same touch sensor for multiple user inputs decreases the number of user input devices that are separate from the touchscreen. Further, reserving space on the touchscreen display for a "favorite telephone numbers" button, regardless of the application invoked, reduces the touchscreen real estate that can be provided to applications. A solution can be to apply a twin-swiping input to invoke specific functions on the telephone.

A twin-swiping input presenting a list of the user's favorite contacts can include a selection of a contact during a motion that is integral with the twin swipe. After the user has swiped onto the screen and the list of favorite contacts has been displayed, the user may continue to contact the screen with his finger until he moves his finger across a contact he would like to call. Upon releasing his finger from the touchscreen, the telephone may call the selected contact (i.e., the last contact contacted by the user's finger). In some implementations, as the user moves his finger over each contact, that contact changes in visual appearance to indicate selection of the contact.

In some implementations, a user input feature may be invoked by swiping from the touch sensor to touchscreen without regard for a location of user release from the touchscreen. For example, a swipe from a touch sensor to the touchscreen may display the contact record for the last number called, regardless of where the user releases his finger from the touchscreen. Tapping the touch sensor may initiate a call with the last number dialed, while holding down the touch sensor may open a text message addressed to the last number dialed.

Some sequences of user interactions between a touch sensor and the touchscreen may not invoke secondary actions associated with a twin-swiping input. For example, if a touch sensor is pressed and the touchscreen is swiped across several seconds later, the secondary action may not be invoked. If the touch sensor is pressed, but the successive swipe across the touchscreen is determined to originate from a location that is not near the touch sensor, the secondary action may not be invoked. If the successive swipe across the touchscreen does not originate along a border of the touchscreen (e.g., the swipe originates from an interior of the touchscreen), the secondary action may not be invoked.

Heuristics may be used to identify the combinations of touch sensor and touchscreen inputs that invoke the swiping secondary action. For example, the swipe across the touchscreen may need commence within a predetermined time within contact of the touch sensor or release of the touch sensor. The swipe across the touchscreen may need to originate from an edge of the touchscreen and move inwards towards a center of the touchscreen (e.g., excluding touchscreen swipes that start within an interior of the touchscreen and move outward). The edge of the touchscreen where the swipe across the touchscreen originates may need to be the edge that is proximate to the touch sensor. The swipe across the touchscreen may need to continue for a predetermined distance. Further, the swipe across the touchscreen may need have a trajectory that could reasonably have originated from the touch sensor.

In some implementations, a user can place his finger on the touchscreen and swipe off the touchscreen and onto a touch sensor to invoke an on-to-off touchscreen secondary action. In some implementations, the user may need to apply pressure to the touch sensor for a predetermined amount of time before releasing his finger from the touch sensor in order for an on-to-off touchscreen secondary action to be invoked. In other words, the user may need to pause and hold his finger on the touch sensor.

In some implementations, the action that is invoked when swiping from the touchscreen to the touch sensor depends on the originating location of the swiping motion across the touchscreen. For example, the touchscreen may include a list of a user's contacts. If the user taps a region corresponding to each contact, a contact record displaying telephone numbers, email addresses, and physical addresses for the contact record may be displayed. However, if the user presses on a contact and then swipes his finger off the touchscreen and onto a touch sensor with a green telephone indicia, the telephone may initiate a call to the selected contact.

In some implementations, the touchscreen is initially turned off so that the touchscreen is not displaying content at the beginning of a twin-swiping input. The touchscreen, however, may be activated to determine that the touchscreen has been contacted. If a twin-swiping input is identified, the touchscreen may turn on and invoke operations or a function that would otherwise not have been invoked by contacting the touch sensor or the touchscreen independently. For example, a user may tap a "Power" touch sensor button to turn the telephone on. However, if the user swipes his finger across the "Power" touch sensor button and onto the touchscreen, the touchscreen may turn on and display a different screen than if the user had only tapped the "Power" button. Example different screens can include the screens presented in the Figures and discussed throughout this document. In some implementations, the touchscreen is activated to receive user contact after the user contacts the touch sensor. In some implementations, the touchscreen displays turns on to display content after contact with the touch sensor is determined. In some implementations, the content displayed after the touchscreen has turned on (in response to contacting the touch sensor) is changed in response to user contact with the touchscreen.

In general, one aspect of the subject matter described in this specification can be embodied in a computer storage medium encoded with a computer program. The program includes instructions that when executed by data processing apparatus cause the data processing apparatus to perform operations. The operations include identifying a swiping action between a touch sensor and a touchscreen that are both coupled to a computing device. The identification of the swiping action includes determining, while the computing device is in a state that provides a first graphical display on the touchscreen, that the touch sensor has been physically contacted by a user. The identification includes determining that the physical contact with the touch sensor has ended. The identification includes determining, within a predetermined time period of the end of the physical contact, that a dragging motion across the touchscreen has originated at a peripheral edge of the touchscreen. In response to identifying the swiping action, a predetermined computerized routine is invoked that replaces the first graphical display with a second graphical display. User interaction with the touch sensor or touchscreen individually do not invoke the predetermined computerized routine.

Another aspect of the subject matter described in this specification can be embodied in a computing device. The computing device includes a housing and a touchscreen display coupled to the housing so that a display surface of the touchscreen is visible to a user of the device. The computing device includes a touch sensor coupled to the housing so that a user of the device can physically contact and activate the touch sensor. The computing device includes one or more processors mounted in the housing. The computing device includes a computer-readable medium connected to the one or more processors and having instructions stored thereon which, when executed by the one or more processors, cause the one or more processors to perform operations. The operations include determining, while the computing device is in a state that provides a graphical display on the touchscreen, that the touch sensor has been physically contacted by the user. The operations include determining that contact with a surface of the touchscreen at a peripheral edge of the touchscreen has occurred. The operations include determining that the physical contact with the touch sensor has ended. The identification of the end of the physical contact occurs within a determined time interval following the identification of the contact with the surface of the touchscreen display. A predetermined computerized routine is invoked, in response to identifying that the physical contact with the touch sensor has ended. The computerized routine modifies the graphical display of the touchscreen. User interaction with the touch sensor or touchscreen individually do not invoke the predetermined computerized routine.

In yet another aspect, the subject matter described in this specification can be embodied in a computing device that includes a housing and a touchscreen display coupled to the housing so that a display surface of the touchscreen is visible to a user. The computing device includes a touch sensor coupled to the housing so that a user may physically contact and activate the touch sensors and one or more processors coupled to the housing. The computing device includes a means for (i) identifying a swiping user input that includes user interaction with the touch sensor and the touchscreen and for (ii) invoking a predetermined computerized routine that modifies a graphical display of the touchscreen in response to the identification of the swiping user input. User interaction with the touch sensor or touchscreen individually do not invoke the predetermined computerized routine.

In one additional aspect, the subject matter described in this specification can be embodied in a computer storage medium encoded with a computer program. The program includes instructions that when executed by data processing apparatus cause the data processing apparatus to perform operations. The operations include identifying a swiping action from a touchscreen display to a touch sensor of a computing device. The identification of the swiping action includes determining, when the computing device is in a state that provides a first graphical display, a dragging across a surface of the touchscreen display that terminates at a peripheral edge of the touchscreen. The identification includes determining within a predetermined time window that includes time after the termination of the lateral motion, that the touch sensor has been physically contacted by a user. In response to identifying the swiping action, invoking a predetermined computerized routine that is not otherwise invoked when the computing device is in the state the that provides the first graphical display through physical contact with the touch sensor or a single physical user interaction with the touchscreen individually.

These and other implementations can optionally include one or more of the following features. Identifying the swiping action between the touch sensor and the touchscreen can include determining that a numerically positive delay between the end of the physical contact and an origination of the dragging motion across the touchscreen has occurred. The predetermined computerized routine that replaces the first graphical display may not otherwise be invoked through (i) a physical contact with the touch sensor when the computing device is in the state that provides the first graphical display or (ii) a single physical user interaction with the touchscreen when the computing device is in the state that provides the first graphical display. The single physical user interaction with the touchscreen can include a tap, dragging motion across the touchscreen, or a multi-touch user interaction. Identifying the swiping action between the touch sensor and the touchscreen can include determining a location of a point of release of the dragging from the touchscreen. The invocation of the predetermined computerized routine can be dependent on the location of the point of release. Identifying the swiping action between the touch sensor and the touchscreen can include determining that a termination point of the dragging is at a peripheral edge of the touchscreen. Identifying the swiping action between the touch sensor and the touchscreen can include determining that the termination point is within a region from among multiple regions along the peripheral edges of the touchscreen. The invocation of the predetermined computerized routine can be dependent on determining that the termination point is within the region in distinction to other regions. The predetermined computer routine can invoke the computing device to enter a state in which a location of touchscreen contact from the dragging motion triggers audio cues that are not otherwise triggered through a single user interaction with the touchscreen display when the touchscreen display provides the first or second graphical display. The operations can include determining a trajectory of the dragging on the touchscreen. The operations can include determining that the touch sensor is an apparent initiation location of the dragging, the apparent initiation location external to the touchscreen and based on the determined trajectory of the dragging. The predetermined computerized routine can be invoked in response to determining that the touch sensor is the apparent initiation location of the lateral motion. A portion of a face of a housing for the computing device that is visible to the user can separate the touchscreen from the touch sensor.

The predetermined computerized routine may not otherwise be invoked through (i) a physical contact with the touch sensor alone or (ii) a single physical user interaction with the touchscreen when the touchscreen is in the state that provides the graphical display. The determining that contact with the surface of the touchscreen has occurred includes determining that the contact is with a surface of the touchscreen that is at a peripheral edge of the touchscreen that is adjacent to the touch sensor. The operations may include determining a location of a point of release from the touchscreen display. The release from the touchscreen display can terminate a dragging that originated with the contact with the surface of the touchscreen. The invocation of the predetermined computerized routine can be dependent on the location of the point of release being within a region of the touchscreen from among multiple regions of the touchscreen, the multiple regions of the touchscreen associated with different predetermined computerized routines. The touch sensor can be a capacitive touch switch. The touch sensor can be a resistive touch switch. The touch sensor can be a physical touch switch. A backlight can illuminate a region of the computing device associated with the touch sensor. The operations can include turning the backlight on in response to: (i) determining that the touch sensor has been physically contacted, (ii) determining that the physical contact with the touch sensor has ended, or (iii) determining that contact with a surface of the touchscreen display has occurred. The backlight can be turned off upon determining that a release of the contact with the surface of the touchscreen has occurred. The predetermined computerized routine can replace the first graphical display with a second graphical display.

Particular embodiments can be implemented, in certain instances, to realize one or more of the following advantages. The number of input components can be reduced on a mobile computing device. Touch sensors can each be associated with secondary functions. A different user interface can be quickly invoked without contacting the touchscreen multiple times. Navigational feedback in the form of audio commands can be activated to allow the activation of commands when the touchscreen is not visible (e.g., in a pocket or purse). An application that is invoked on the mobile computing device can receive the entire region of the touchscreen for display, yet secondary functions can be activated without providing icons for display on the device.

The details of one or more embodiments are set forth in the accompanying drawings and the description below. Other features, objects, and advantages will be apparent from the description and drawings, and from the claims.

DESCRIPTION OF DRAWINGS

FIG. 1 is an illustration of a twin-swiping input that involves multiple input components of a mobile telephone FIGS. 2A-D illustrate steps of a twin-swiping input that includes selection of a graphical user interface element in a modified touchscreen display.

FIG. 5 is an illustration of a twin-swiping input from a touchscreen to a touch sensor.

Like reference symbols in the various drawings indicate like elements.

DETAILED DESCRIPTION

Figure 2B:
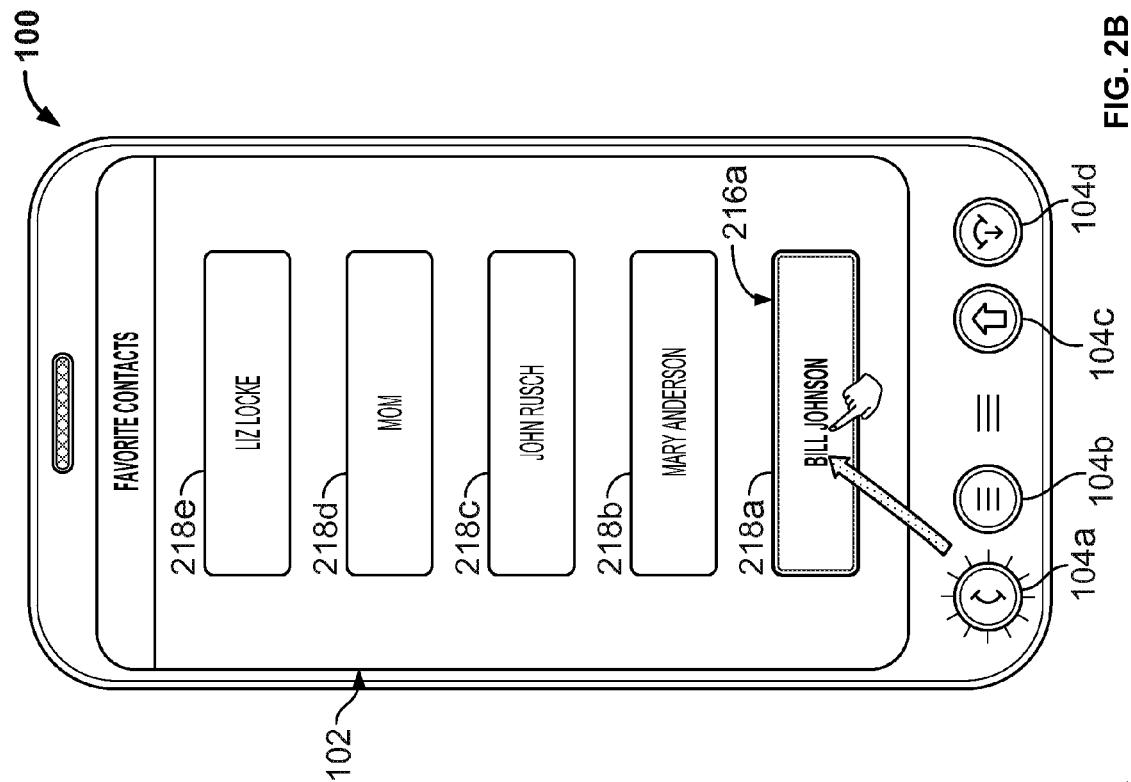

This document generally describes identifying a form of user input that includes a combination of interactions with a touch sensor and a touchscreen of a computing device. As an illustration, a user may swipe his finger across the face of a mobile telephone, from an inexpensive touch sensor and onto the touchscreen. The sequence of user inputs can invoke the mobile telephone to perform a predetermined action (e.g., call up an application). A similar form of user input can be performed by swiping a finger from the touchscreen to the touch sensor. These forms of swiping actions may be referenced in this document as twin-swiping inputs.

FIG. 1 is an illustration of a twin-swiping input that involves multiple input components of a mobile telephone. The illustration depicts the face of a mobile telephone 100 that includes a speaker 106 and a microphone 108. Mounted within the housing of the mobile telephone is a touchscreen display device 102, or touchscreen for short. In this illustration, the telephone is in a state in which the touchscreen displays icons associated with different applications (e.g., icons 110a-k). A user may be able to invoke an application by tapping the touchscreen 102 in a region that is associated with a display of one of the applications. A user may be able to drag the icons 110a-k around the touchscreen by pressing his finger to an icon and moving his finger around the touchscreen 102.

The mobile telephone 100 includes a set of touch sensors 104a-d. The touch sensors may be relatively inexpensive capacitive or resistive touch switches that a user can contact to perform a predetermined action. Unlike the touchscreen, which is a display device capable of producing multiple different images, each touch sensor may not be a display device and may not be able to produce multiple different images. Each touch sensor may be associated with an active area designated by graphics, relief patterns, or features to otherwise give the user visual and/or tactile indicia for locating the sensors and indicating the functions controlled by the sensors. The indicia or relief patterns, however, may not be adjustable by the computing device. Each touch sensor may be associated with no more than two states (contacted and non-contacted), unlike a touchscreen which can be associated with multiple states associated with different positions of user contact.

Selection of the touch sensors 104a-d may impact the operation of the mobile telephone. For example, if a user presses the "Call" touch sensor 104a, the telephone may dial the last number called or may present on the touchscreen 102 a list of recently dialed telephone numbers. If a user presses the "Contacts" touch sensor 104b, a list of all of the user's contacts may appear for display on the touchscreen 102. If a user presses the "Home" touch sensor 104c, the mobile telephone may present the display of application icons depicted in the illustration of FIG. 1. If a user presses the "End Call" touch sensor 104d, the mobile telephone may end an active telephone call.

The touch sensors 104a-d may each invoke more than one action (e.g., a function or predetermined computerized routine) by the mobile telephone 100. For example, each touch sensors action may vary depending on a state of the mobile telephone. If the a call is being received, pressing the "Call" touch sensor 104a may answer the call. If a call is not being received, the "Call" touch sensor 104a may provide a list of recently dialed numbers. Additionally, holding down each sensor for a predetermined amount of time (e.g., half a second) may invoke a secondary action, either immediately upon the expiration of the time or upon the expiration of the time followed by a release of the sensor. If a user holds down the "Call" touch sensor 104a for awhile, the last number may be redialed. In these examples, the touch sensors 104a-d may each provide for multiple actions. Each touch sensor, however, may only be able to provide a signal indicating one of two states—on or off.

In the illustration of FIG. 1, the user has invoked an action to edit the settings of a selected application by performing a twin-swiping user input. In this illustration, the user has contacted the "Call" sensor 104a at time (1), dragged his finger across a face of the mobile telephone 100 to the "email" application 110b at time (4), and released his finger from contact with the touchscreen while over the "email" application 110b. This twin-swiping action is illustrated by the segmented arrow 160 and the release of the finger from the touchscreen is designated by the dashed arrow 118. In response to the swiping action, the mobile telephone 100 provides for display on the touchscreen device 102 a graphical interface for editing the settings for the email application. For example, the graphical interface may permit the user to add or delete email accounts, change account passwords, etc.

The twin-swiping user input includes a sequence of user interactions with the touch sensor 104a and the touchscreen 102. The sequence may include identifying a contacting of touch sensor 104a followed shortly thereafter by an identified lateral movement (also referred to as "dragging") of a finger across the touchscreen 102. Various heuristics may be used to determined if the lateral movement of the finger is associated with a swiping action that originated from the touch sensor 104a. These heuristics are described connection with FIG. 3.

Upon identifying a twin-swiping input, the telephone 100 may invoke a different state of operation. In this different state, the mobile telephone may not respond to the user swiping across the surface of the touchscreen 102 in the same manner as if the user had not previously swiped his finger across the touch sensor 104a. For example, if the user swipes his finger onto the touchscreen in the same manner as in the swiping of actions (2)-(4), but without contacting the touch sensor 104a, the user input may be treated as a scrolling interaction. The icons 110a-k may be "pushed" up and additional icons may be presented for display on the touchscreen 102.

In contrast, upon identifying a twin-swiping input, the icons 110a-k may remain stationary and a star 112 may appear around a location of the user contact and move with the location of user contact as the location of contact is laterally moved across a surface of the touchscreen 102. An informational dialog 114 may appear and move with the location of contact. In this example, the informational dialog informs the user that he can "Edit Settings" of an application for a selected icon. The user selects the "Email" application 110b by releasing his finger from the touchscreen 102 when his finger is over the email application icon 110b.

FIGS. 2A-D illustrate steps of a twin-swiping input that includes selection of a graphical user interface element in a modified touchscreen display. In the illustration, the swipe from the touch sensor onto the touchscreen triggers a display of a different graphical interface for "Favorite Contacts."

Figure 2A:
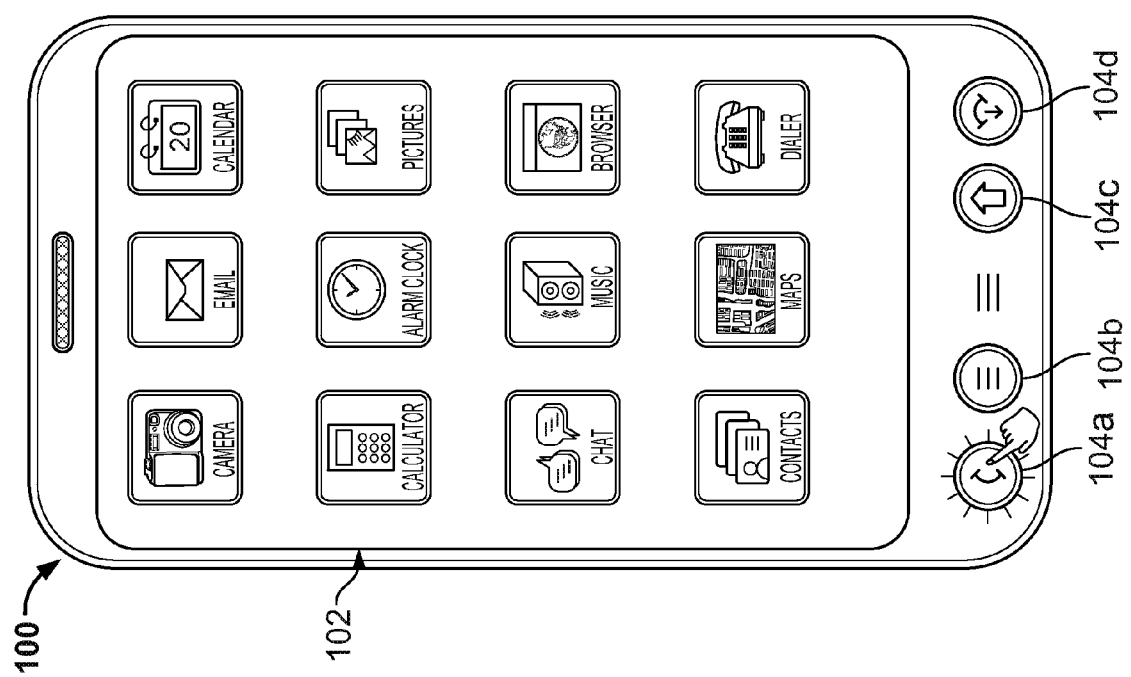

FIG. 2A illustrates a selection of the "Call" touch sensor 104a. A user can select the "Call" touch sensor 104a by swiping his finger over the sensor 104a or by pressing and holding his finger over the sensor 104a. In some implementations, a backlight illuminates the sensor 104a upon the sensor's selection.

In FIG. 2B, the user has swiped his finger from the "Call" sensor 104a onto a portion of the touchscreen 102. The mobile telephone has detected the twin-swiping input and, in response, has replaced the displayed list of icons (as shown in FIG. 2A) with a list of the user's "Favorite Contacts" (as shown in FIG. 2B). The example list depicted in FIG. 2B includes five contact records 218a-e. As the user laterally slides his finger across the touchscreen and over each contact record, the contact record with focus is highlighted (see the highlighted region 216a of contact record 218a).

FIG. 2C illustrates the user's selection of the "Mom" contact record 218d. The user has swiped his finger from the "Call" touch sensor 104a across the surface of the touchscreen (without removing his finger therefrom), and has released his finger from the touchscreen after providing focus to the "Mom" contact record 218d (thus selecting the "Mom" contact). In some implementations, the backlight for touch sensor 104a remains illuminated until release of the user's finger. The backlight may illuminate upon contacting the sensor 104a, releasing the sensor 104a, contact with the touchscreen 102, or identification of the twin-swiping input.

As depicted in FIG. 2D, in response to selection of the "Mom" contact record 218d, the mobile telephone 100 initiates a telephone call to "Mom" and changes from a "contact lookup" state to a "dialing" state. The displayed graphical interface changes with the state. For example, the display on the touchscreen 102 of FIG. 2D depicts information about who is being called and displays icons that can be selected to initiate predetermined actions by the telephone 100. The display in FIG. 2D replaced the display of contacts shown in FIG. 2C. The new display can include a new user interface with a new backdrop, presentation scheme, and graphical interface elements for selection by the user.

The twin-swiping input and corresponding response that is illustrated in FIGS. 2A-D can provide several benefits. The twin-swiping input can effectively double the number of actions provided by the touch sensors 104a-d. Further, the twin-swiping input can be performed by a single-action finger swipe that can be quicker for a user to perform than tapping one of the touch sensors 104a-d and then tapping an icon on the touchscreen 102. If a user performs a twin-swiping input, and thereafter decides that he doesn't want to invoke the any action (e.g., he sees that the list of favorite contacts that pop up do not include the person that he wants to call), he may simply swipe his finger off of the touchscreen 102 and the telephone may revert back to the original display with no action invoked.

In some implementations, the features or actions that are activated in response to receiving a twin-swiping input are not available through contact with touch sensors 104a-d or a single physical user interaction with the touchscreen 102. As an example, a user may not be able to invoke a display of "Favorite Contacts" (as shown in FIGS. 2B-2C) by contacting any of the touch sensors 104a-d alone or in combination. Similarly, no single contact with the touchscreen 102 may invoke the display of the "Favorite Contacts" screen. For instance, a user may invoke applications by tapping icons 110a-k, however, none of these icons may correspond to a display of the "Favorite Contacts."

Further, the user may not be able to invoke the action associated with the twin-swiping input by tapping on any other graphical element displayed on the touchscreen 102 or performing any single swiping action across the surface of the touchscreen (whether including a single finger or multiple fingers at the same time as with a multi-touch display). For example, a user may be able to invoke a display of "Favorite Contacts" by tapping on the "Contacts" icon 110i and thereafter selecting another graphical interface element to show the list of favorite contacts. This path, however, includes multiple user inputs with the touchscreen (i.e., at least two taps).

Figure 3:
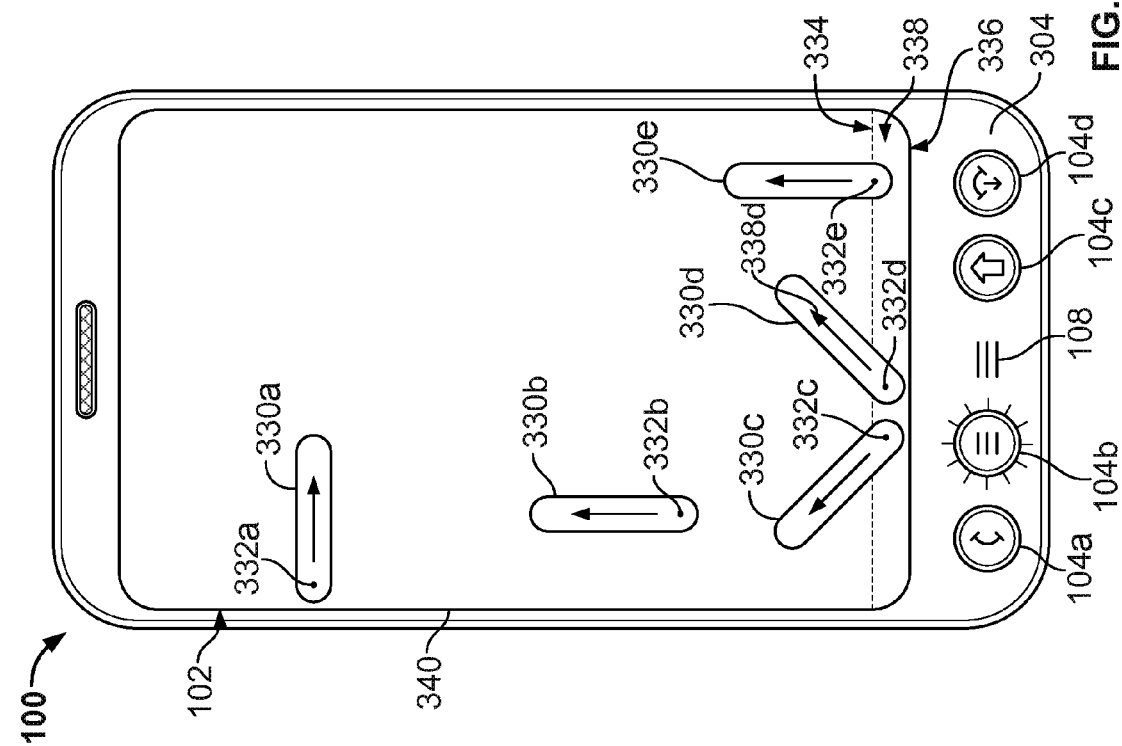
FIG. 3 illustrates example lateral movements across the surface of a touchscreen display device.

FIG. 3 illustrates example lateral movements 330a-e across a surface of the touchscreen display device 102. The following discussion provides examples of heuristics that can identify lateral movements that—when received in combination with a touch sensor contact—invoke actions that are associated with a twin-swiping input. In other words, not all lateral movements across a touchscreen 102 (i.e., touchscreen swipes) can be used to perform a twin-swiping input.

In this illustration, the mobile telephone 100 has received indication of physical contact with the "Contact List" touch sensor 104b. The received indication of physical contact with the touch sensor 104b is thereafter followed by an indication of a successive lateral movement across the touchscreen 102 (e.g., any of the lateral movements 330a-e). Heuristics may determine if the successive lateral movement satisfies criteria sufficient to invoke an action associated with a twin-swiping input. The example illustrations of successive lateral movements are displayed in FIG. 3 as ovals with directional arrows displayed therein. The displayed lateral movements may only identify a first portion of a lateral movement necessary for the telephone 100 to identify whether or not the lateral movement completes a twin-swiping input.

In some implementations, the swipe 330d may complete a twin-swiping input when it follows user contact with the "Contact List" touch sensor 104b. The twin-swiping input may be identified because the swipe 330d began within a specific time period following or before the release of contact with the touch sensor 104b, exceeded a threshold velocity across the touchscreen 102, commenced near an edge of the touchscreen 102 that is proximate to the touch sensor 104b, and followed an on-screen trajectory 338d that is determined to have an off-screen origination near the touch sensor 104b.

In some implementations, a touchscreen swipe may not invoke an action associated with a multi-component swipe if the delay between release of the touch sensor and the beginning of the touchscreen swipe exceeded a threshold time period. For example, the touchscreen swipe may need to begin within 0.05, 0.1, 0.15, 0.2, 0.25, 0.3, 0.4, or 0.5 seconds of the release of the touch sensor. A delay of a second may be indicative that the touch sensor contact and the touchscreen swipe were not coordinated actions by the user. This example heuristic may apply where a portion of telephone housing 304 separates the touch sensor 104b and the touchscreen 102 (e.g., as illustrated in FIG. 3).

In some implementations, a touchscreen swipe may not invoke an action associated with a multiple-component swipe if the touchscreen swipe begins before the touch sensor is released from physical contact. Thus, the touchscreen swipe may need to begin after a threshold delay. This example heuristic may apply where a portion of telephone housing 304 separates the touch sensor 104b and the touchscreen 102 (e.g., as illustrated in FIG. 3). The time gap may be indicative of a user's finger moving over a portion of the mobile telephone's housing 304 that is free of user input components.

In some implementations, a touchscreen swipe may be permitted to begin before the touch sensor 104b is released from contact. In such implementations, the release from contact with the touch sensor 104b may need to occur within a predetermined window of time or distance upon the origination of a touchscreen lateral movement. This example heuristic may apply where the touch sensor is placed in close proximity to the touchscreen 102 and a user's finger may contact both the touch sensor and a portion of the touchscreen at the same time. For example, if contact with the touch sensor continues after a touchscreen lateral movement has moved outside of a centimeter window of distance, no action associated with a twin-swiping input may be performed.

In some implementations, the lateral movement 330b may not invoke an action associated with a twin-swiping input because the lateral movement 330b did not originate near the edge 336 of the touchscreen 102. For example, a first determined point of contact 332b may need to be within a predetermined distance of edge 336. The first determined point of contact 332b may be the first touchscreen contact received by the telephone following contact with or release of touch sensor 104b. The touchscreen contact can be the center of a region of contact, whether identified as any contact with the touchscreen or contact of a specific form (e.g., a region associated with the pad of a finger or a stylus). The first predetermined point of contact may need to be within a region 338 proximate to an edge of the touchscreen 102 and bounded by a boundary 334.

In some implementations, the lateral movement may need to begin at the edge 336 of a substantially rectangular touchscreen 102 that is proximate to the touch sensor 104b. For example, the lateral movement 330a commences near an edge 340 that is not proximate to the touch sensor 104b.

In some implementations, lateral movement 330e may invoke an action associated with a twin-swiping input when received in combination with a contact with the "End Call" touch sensor 104d. Although lateral movement 330e does not commence as close to the edge 336 of the touchscreen 102 as lateral movements 330c and 330d, lateral movement 330e commences within region 338. Lateral movement 330e may not begin right at the edge of touchscreen 102 if the surfaces of the touch sensor, housing 304 and touchscreen 102 are not flush. For example, the touchscreen may be recessed from the housing 304 and a user's finger may "jump" into mid-air as it moves from the housing to the touchscreen 102. Additionally, a portion of an after-market case may be placed over the region between the touch sensor and the touchscreen 102.

In some implementations, an action associated with a twin-swiping input is invoked only if the trajectory of the lateral movement is such that a determined off-screen point of origination of the lateral movement is near the previously contacted touch sensor. For example, lateral movement 330c originates from a location on the touchscreen 102 that is closer to the touch sensor 104b than the swipe 330d, however, the trajectory of the lateral movement 330c originated from a location near the microphone 108 of the telephone 100. In some example implementations, the telephone 100 may determine—after receiving contact with a touch sensor and a successive initial contact with the touchscreen 102—a trajectory of the subsequent lateral movement across the touchscreen that is needed to complete the combination user-input action. In some implementations, the telephone 100 identifies a range of trajectories (e.g., angles) that a lateral movement may proceed along for a point of initial touchscreen contact.

In some implementations, the lateral movements 330a-e are a region of the first portion of the swipe. A user may not release his finger from contact with the touchscreen 102 after reaching the end of what is illustrated as the lateral movements 330a-e. The lateral movements 330a-e may represent the information that is necessary to identify if a lateral movement meets criteria to associate it with a twin-swiping input. Indeed, upon receiving information sufficient to identify a multi-component swiping action, the state of the mobile telephone 100 may change (e.g., as illustrated in FIGS. 2A-D), and the user may select a newly presented graphical element.

The requirements for a lateral movement to complete a twin-swiping input can be implemented using heuristics that a processor in communication with touchscreen 102 implements. Any or all of the above described requirements may be used to identify which forms of lateral movement across a touchscreen—when received in connection with the selection of a touch sensor—trigger an action that is unique to the twin-swiping user input. In some implementations, a user may only need to contact a touch sensor and an edge region of the touchscreen 102 that is proximate to the sensor within a predetermined time period to active features associated with a multi-component user input. In such an implementation, motion across the touchscreen 102 directional information may be unnecessary.

In some implementations, the telephone 100 may delay the invocation of an action associated with "tapping" a touch sensor 104a-d to identify if a lateral movement across the touchscreen 102 originates. If contact with the touchscreen 102 is identified, the telephone 100 may continue to delay any actions associated with either the "tapping" or with a "twin-swiping input" until enough information from the lateral movement is available to identify if the lateral movement completes a twin-swiping input.

Figure 4:
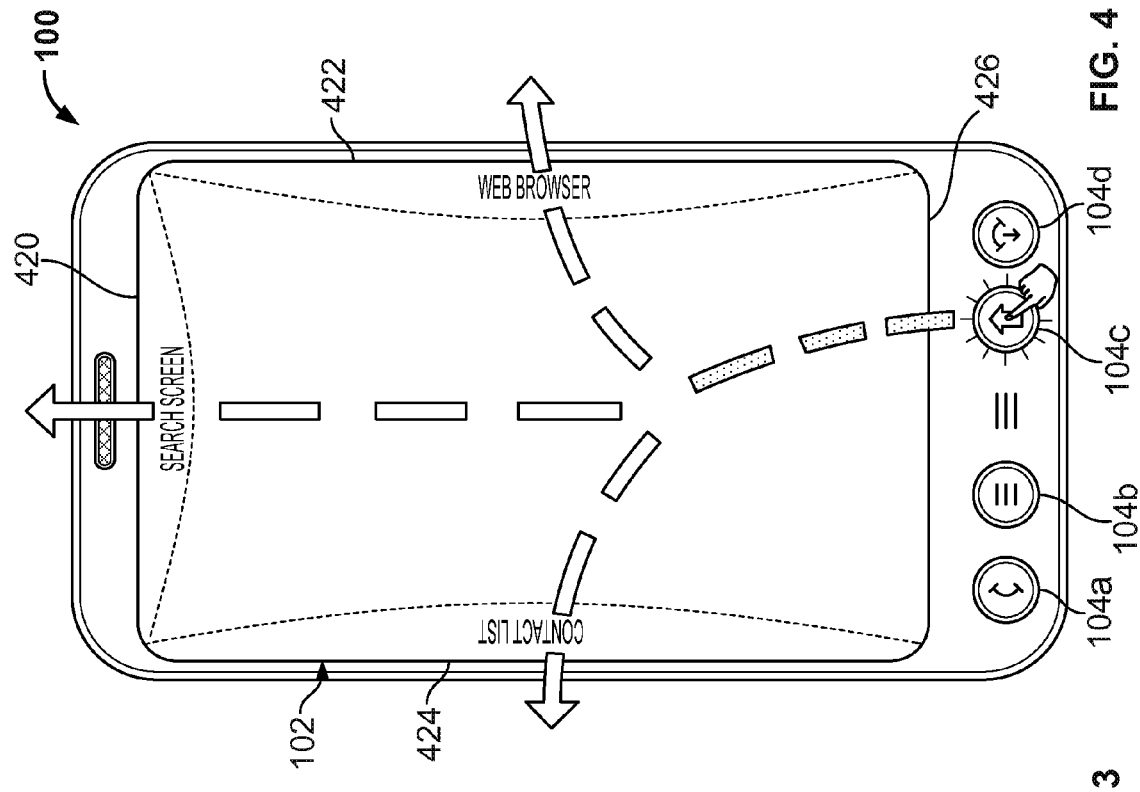
FIG. 4 is an illustration of a telephone 100 that can invoke actions through off-screen swipes.

FIG. 4 is an illustration of a telephone 100 that can invoke actions through off-screen swipes. After identification of an twin-swiping input, the action that is invoked can be dependent upon detecting a border region of the touchscreen that the user swipes off of. As an illustration, after a user swipes his finger from the touch sensor 104c and onto the touchscreen 102, an action invoked by the telephone 100 may depend upon an edge of the touchscreen 102 that the user swipes his finger off of. If the user swipes off the top edge 420 of the touchscreen 102, the telephone 100 may invoke a "Search Screen" application. If the user swipes off the left edge 424 of the touchscreen, the telephone 100 may invoke a "Contact List" application. If the user swipes off the right edge 422 of the touchscreen, the telephone may invoke a "Web Browser" application.

In some implementations, upon detecting a twin-swiping input from the touch sensor 104c to the touchscreen 102, the display on the touchscreen may change. The new display may describe the actions that are invoked by swiping off of each edge or region of the touchscreen 102. In some implementations, a user may select graphical elements from an interior of the touchscreen 102 if the user does not swipe off the edge of the touchscreen. For example, a user may release his finger over a contact, as illustrated in FIG. 2C.

Swiping off the touchscreen 102 can invoke any of multiple applications on the telephone 100. Additionally, swiping off the touchscreen 102 can invoke certain actions. For example, one of the touch sensors 104a-d may be associated with navigational commands. If a user is viewing a web browser, swiping off the left side of the screen may go back a page, swiping off the right side of the screen may go forward a page, swiping off the top of the screen may refresh the display, and swiping back down to the bottom of the screen may take the user to a home page. The web browser may turn opaque upon detecting a twin-swiping input and text along each border may appear. For example, the text may state "Back," "Forward," "Refresh," and "Home."

FIG. 5 is an illustration of a twin-swiping input from a touchscreen to a touch sensor. In this illustration, a user has physically contacted the touchscreen 102 at the displayed location of a "Miles Dunham" contact 510. The user maintains his finger in contact with the touchscreen 102 and laterally swipes his finger off the touchscreen 102 and onto the touch sensor 104a. In response, the telephone 100 may generate a blank text message addressed to Mr. Dunham. The on-to-off screen swiping can invoke this secondary action for the Miles Dunham contact 510. For example, the primary action—calling Mr. Dunham—may be invoked by tapping the portion of the touchscreen 102 displaying the Miles Dunham contact 510.

In some implementations, the methods described in association with FIG. 5 may invoke heuristics similar to those in FIG. 3. For example, the contact with the touch sensor 104a may need to occur within a window time period that includes the end of contact with the touchscreen 102. A time-gap may need to exist between the end of contact with the touchscreen 102 and the contact with the touch sensor 104a. A user may need to contact the touch sensor 104a for a determined amount of time (i.e., the user may need to "stop" his swipe on the touch sensor instead of swiping quickly over the touch sensor). Conversely, a user may need to swipe over the touch sensor without stopping. Stopping on and swiping over a touch sensor may provide for different actions (e.g., generating a text message or generating an email to Mr. Dunham).

In some implementations, the contact with the touch sensor 104 may need to be in line with the trajectory of the on-screen swipe. In some implementations, an action associated with an on-to-off screen swipe is not invoked even though other criteria are met. For example, the user may touch his finger to the right side of the contact 510 and swipe downward, touching the sensor 104d. This action may be similar to a touch and swipe of the scrollbar 406 and thus is ignored. In some implementations, if a component is being moved on the screen (e.g., the scrollbar 406), a twin-swiping input is disabled.

The described on-to-off screen twin-swiping input can invoke any of a number of functions. Selection of a graphical element on the touchscreen and dragging of the graphical element to a touch sensor may be delete the graphical element, invoke settings associated with the graphical element, bookmark the graphical element, or copy the graphical element. Similar actions with respect to selected text may be performed.

Figure 6:
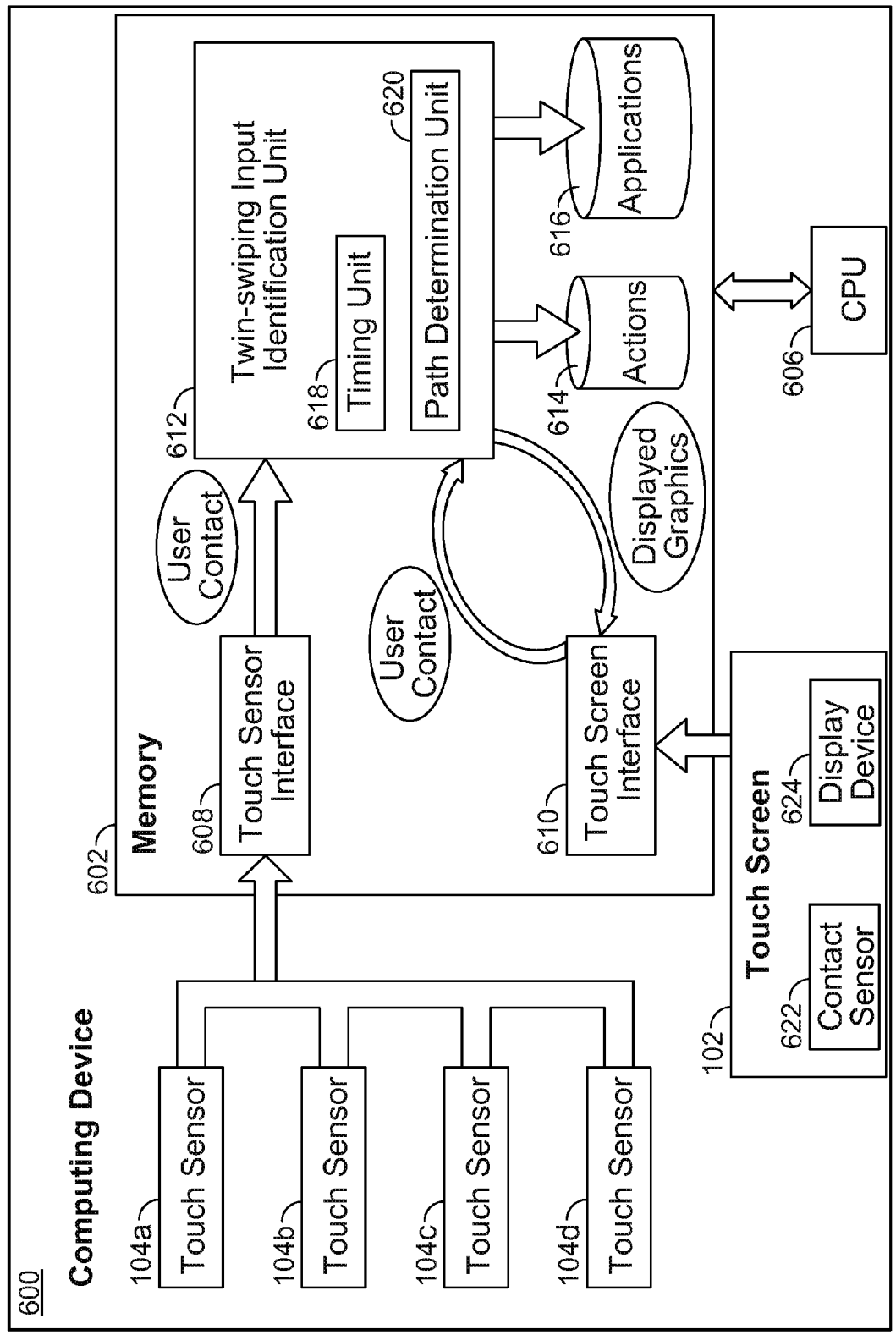
FIG. 6 is a block diagram of an example system for identifying a touch sensor and touchscreen user input combination.

FIG. 6 is a block diagram of an example system for identifying a touch sensor and touchscreen user input combination. In some implementations computing device 600 is the mobile telephone 100 depicted in FIGS. 1-5. Computing device 600 includes a set of touch sensors 104a-d, a touchscreen 102, a central processing unit 606, and memory 602. The memory 602 includes interfaces 608 and 610 for receiving signals from and providing signals to the touch sensors 104a-d and touchscreen 604. The memory 602 also includes a twin-swiping input identification unit 612 for identifying a swipe between a touch sensor 104 and the touchscreen 102.

The touch sensors 104a can be relatively inexpensive when compared to the touchscreen 102. The touch sensors may not be touchscreens that include an array of touch switches. In some implementations, the touch sensors are capacitive touch sensors. For example, the sensor can measure the capacitance coupling with a conductive object, such as a finger, as the finger approaches a surface of the touch sensor or an overlaying material. At a predetermined level of capacitive coupling, the sensor can be considered "pressed." A capacitive touch switch may only need one electrode, placed behind a non-conductive panel, to function.

In some implementations, the touch switch is a resistive touch switch that uses two electrodes. When the two electrodes are physically contacted with something electrically conductive (e.g., a finger), the switch can be considered pressed. In some implementations, the touch sensor includes a sensor portion that is composed of conductive thin lines which constitute a mesh. The conductive thin lines can be electrically separated from each other. When a user touches a region corresponding to the sensor, the lines can be electrically connected, producing a signal and providing a signal that the sensor has been pressed. In some implementations, the touch sensor is a mechanical sensor, a force sensing resistor, a magnetic based sensor, or an optical sensor.

In some implementations, the touch sensor may only provide for two states, on or off. The touch sensor may be sized to receive a single input upon receiving a finger press regardless of minor variations in finger positioning, unlike a touchscreen where a finger pressing a region of the touchscreen can correspond to different inputs depending on the specific placement of the finger. The touch sensors may be arranged in the telephone housing so that a user may individually contact each sensor with a finger. In contrast, sensors in touchscreen can be contacted in combination.

Each touch sensor may be manufactured separately and separately placed into the computing device 600, unlike a touchscreen where an array of sensors are manufactured as a single unit. In some implementations, the touch sensor may be incapable of displaying multi-pixel graphics. The touch sensor may only be lit up by a backlight. Contact with a touch sensor may be associated with a location of the touch sensor or be location-independent. The computing device 100 may not detect the contact with the a touch sensor with more than one of the touch sensors 104a-d.

The touchscreen 102 can be a device that includes a graphical display device 624 having a touch sensitive overlay, along with circuitry and programming that coordinate what is displayed on the screen with what is selected by a user. The touchscreen 102 may be capable of displaying multiple-pixel graphics and can be manufactured as a single unit. A user may be able to touch a surface of the screen and the touchscreen 102 may be able to identify a location of the user input. Example forms of touchscreens include a resistive touchscreen panel, a surface acoustic wave panel, a capacitive panel, a surface capacitance panel, a projected capacitance panel, an infrared panel, a strain gauge panel, and optical imaging panel, a dispersive signal technology panel, and an acoustic pulse recognition panel.

In some implementations, a touchscreen includes multiple sensors that are much smaller than a human finger and are manufactured in an array. Unlike the above described touch sensors, the sensors in a touchscreen may be arranged so that several of the sensors are contacted in a single finger press.

The memory 602 may include interface 608 and 610 that identify when a touch sensor 104 has been pressed, what portion of the touchscreen 102 has been pressed, and provide graphics for display on the touchscreen 102. Each of the touch sensor and touchscreen interfaces 608 and 610 may provide information about touch sensor and touchscreen contacts to the twin-swiping input identification unit 612. The swiping input identification unit 612 may be able to identify, based on physical contact with the touch sensors 104 and touchscreen

604, a physical swipe from a touch sensor 104 to the touchscreen 102. To perform this determination, a timing unit 618 may determine the timing between a touch sensor contact or release and a touchscreen contact. A path determination unit 620 may identify the path or trajectory of a lateral movement across the touchscreen 102, and whether the path meets criteria associated with a swipe from or to a touch sensor.

If the twin-swiping input identification unit 612 determines that a sequence of physical interactions with the touch sensors 104 and the touchscreen 102 meets the criteria twin-swiping input, any of predetermined actions 614 or applications 616 may be invoked.

Figure 7:
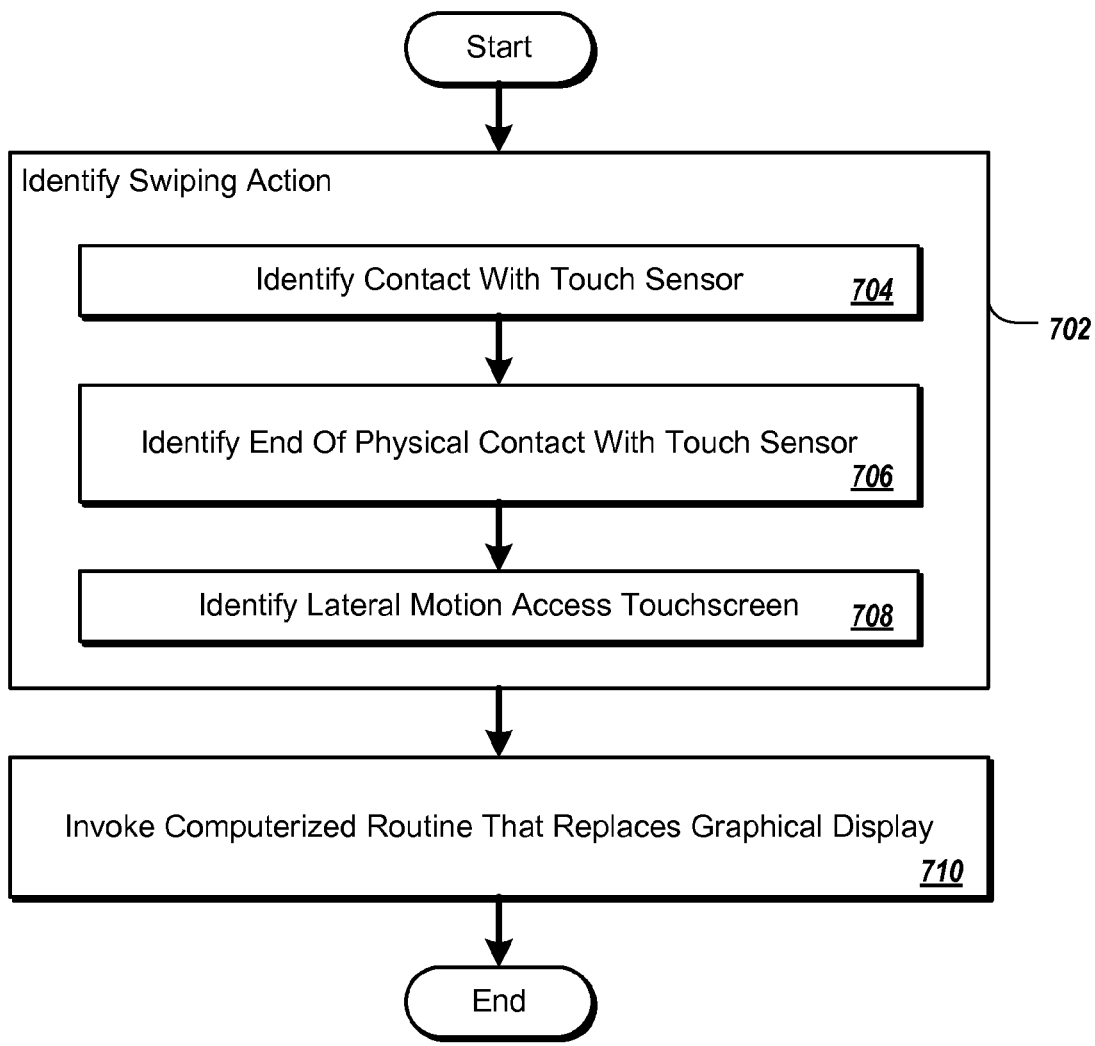
FIG. 7 is a flowchart of an example process for identifying a touch sensor and touchscreen user input combination.

FIG. 7 is a flowchart of an example process for identifying a touch sensor and touchscreen user input combination. In general, the process includes identifying a swiping action between a touch sensor and a touchscreen display device, and, in response, invoking a computerized routine that replaces a graphical display on the touchscreen. The example process of FIG. 10 can be implemented by the systems described in FIGS. 1-6.

In box 702, a swiping action from a touch sensor and onto a touchscreen display device is identified. The algorithms identified in 702 can be a means for identifying a swiping action. The identification performed in box 702 is determined by identifying that a touch sensor has been physically contacted (box 1004). For example, a computerized device may receive a signal indicating that a touch sensor has been physically contacted. Prior to receiving the signal, the computerized device may be in a state that provides a first graphical display on the touchscreen. For example, the touchscreen may show the display of FIG. 2A. The display may be static or may include animated elements.

In box 706, an identification is performed that the physical contact with the touch sensor has ended. For example, the computerized device may receive a signal indicating that the sensor is no longer physically contacted. In some examples, the signal indicating that the sensor has been physically contacted terminates (e.g., a voltage signal returns to a default "uncontacted" state).

In box 708, lateral motion across the touchscreen device is identified. The origination of the lateral motion may need to occur within a predetermined time period (e.g., within 0.2 seconds) of the termination of contact with the touch sensor. In some implementations, the termination of contact with the touch sensor may occur following contact with the touchscreen device, but within a predetermined time period for beginning the contact. The lateral motion may need to originate at a peripheral edge of the touchscreen display device. For example, the first contact originating the lateral motion may need to occur at the outermost position that that touchscreen can receive input. In some examples, the first contact may need to occur within a determined distance of the edge (e.g., 5% of the screen length or 0.6 centimeters). Heuristics for identifying a swiping action are described in more detail with reference to FIG. 3. In some implementations, the operations of box 702 identify user input associated with an on-to-off screen swipe.

In box 710, a predetermined computerized routine that replaces the first graphical display is invoked in response to identifying the swiping action. For example, if the actions of box 702 are performed, a computerized routine may be invoked that otherwise would not be invoked. The computerized routine may not be invoked through contact with the touch sensor alone or through a single user contact and release with the touchscreen. Only the combination of these two actions (possibly with timing and lateral movement directional constraints) may invoke the computerized routine. Indeed, if the computerized device provides a first display to a user, receiving the described swiping action may result in a modification of the first display that is different than if the first display was not received.

The invoked routine can be a (1) command, (2) a display of a changed "cursor," (3) a changed state and display of a changed graphical interface, or (4) a launched application. As a first illustration, a swipe from the touch sensor to the touchscreen and off the left side of the screen may invoke a "back" command in a web browser that is already invoked on the computerized device (See FIG. 4). Similarly a twin-swiping input that terminates in the middle of the touchscreen may launch a "music player" application.

As a second illustration, a swipe from the touch sensor to the touchscreen may retain the same general user interface, however, the display can include a "star" or icon at the location of the user's finger as he swipes his finger across the touchscreen. The "star" may indicate that a secondary action may be performed upon releasing the finger from the screen (e.g., editing an application instead of launching the application). (See FIG. 1).

As a third illustration, a swipe from the touch sensor to the touchscreen may change the computerized device's state. The graphical interface may change from a state where a list of applications are displayed on the touchscreen to a state where a list of favorite contacts are displayed on the touchscreen. (See FIGS. 2A-D).

As a fourth illustration, a swipe from a touch sensor to the touchscreen may launch an application that is selected upon release of the user's contact with the touchscreen. (See FIGS. 2A-D). Among other implementations, the first, second, and fourth illustrations apply to methods where a swiping action proceeds from an interior of the touchscreen to the touch sensor. A command may be performed, a cursor changed as the finger drags a graphical element, or a selected application launched.

In some implementations a twin-swiping input toggles a computing device into an "audio feedback" mode where audio notifications of a graphical interface element are provided to a user. As an illustration, a user of the mobile telephone 100 of FIGS. 2A-D may be listening to music over headphones with the telephone 100 in his jacket pocket. The user may be able to call his mother without taking the telephone out of his pocket by reaching into his pocket, feeling a location of a touch sensor 104a, and swiping his finger from the touch sensor and onto the touchscreen 102.

The swiping action may invoke the display of the favorite contacts screen illustrated in FIG. 2B. As the user moves his finger across each of the contacts 218a-e an audio command stating the name of each contact may be played over his headphones. Invoking such an audio feedback feature allows individuals to use touchscreen devices when the devices are not visible. Invoking the audio feedback feature with a touch sensor can be beneficial because the user may be able to locate the touch sensor by touch when unable to physically view the touchscreen of the display device. For example, a user may be able to select from multiple songs in a playlist. In some implementations, a twin-swiping input feature does not invoke a change in the touchscreen's display when invoking the audio feedback feature. Instead, audio feedback for presently displayed icons can be provided.

The features and operations described in this document can apply to forms of computing device other than mobile telephones that include at least one touch sensor and a touchscreen. For example, a touchscreen monitor mounted to a stand for use as a desktop computer may include touch sensors spaced around the periphery of the monitor. A touchscreen display device mounted horizontally to a floor in a table may include touch sensors spaced around the periphery of the touchscreen. A touchscreen display mounted within a car dashboard may include touch sensors spaced around the touchscreen periphery.

In some implementations, a computing device includes within a housing of the computing device a single touchscreen and at least one touch sensor that is not a touchscreen display device. In some implementations, the descriptions in this document of finger contact with touch sensors and touchscreens also apply to a stylus or another object manipulated by a user to contact a touchscreen or touch sensor.

In some implementations, sequential swiping across multiple touch sensors can invoke a special form of user input. For example, swiping from one touch sensor to another and to a third touch sensor may increase/decrease volume, scroll forward/backward in a video clip, or rotate between screens displayed on a touchscreen display device. The touch sensors may be arranged in a path and be located along a periphery of a touchscreen display device or on the side of a cellular telephone. The touch sensors may not be located on the face of the cellular telephone.

Figure 8:
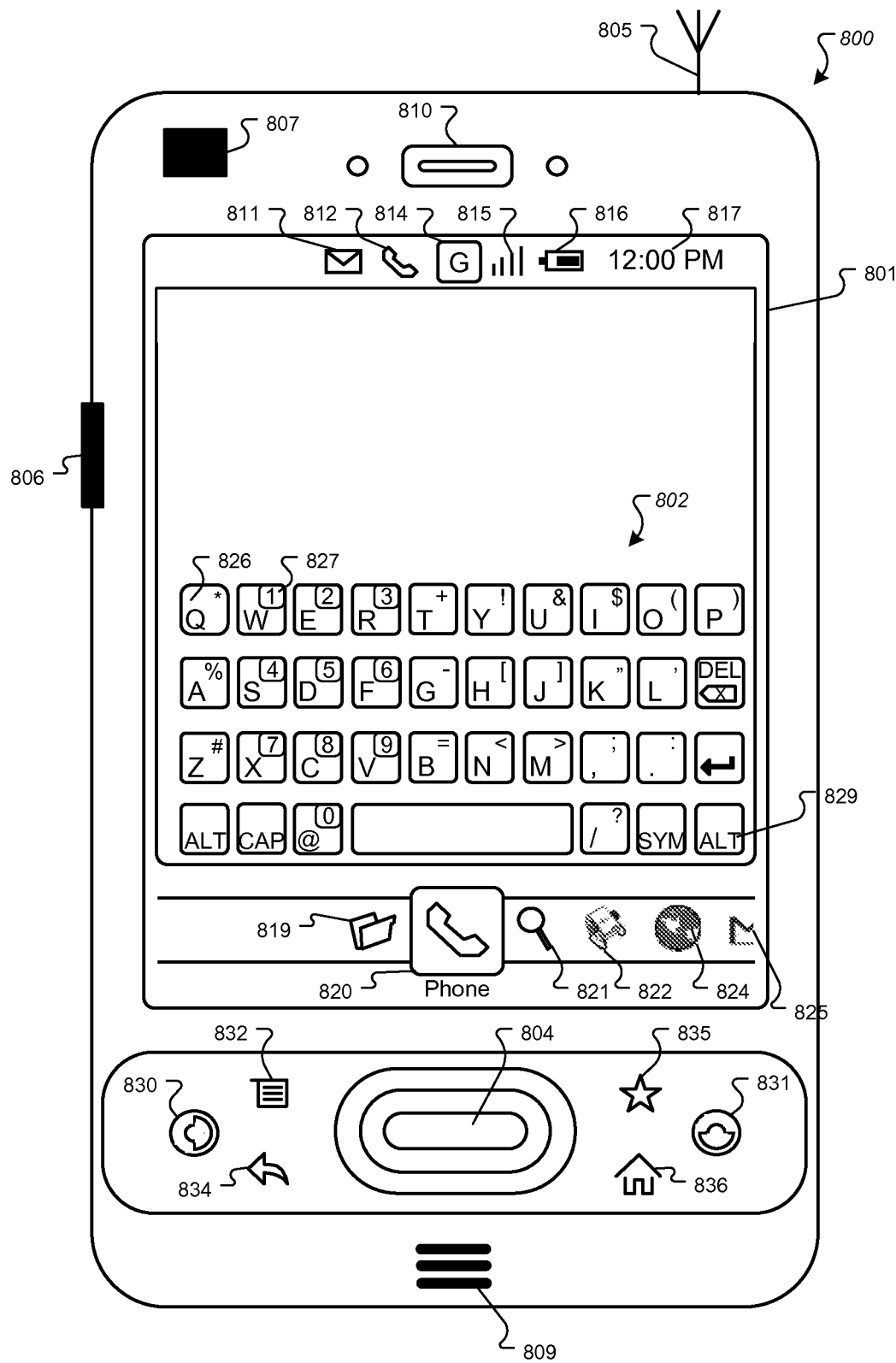
FIG. 8 illustrates the exterior appearance of an exemplary device used to implement the systems and methods described in this document.

FIG. 8 illustrates the exterior appearance of an exemplary device 800 used to implement the systems and methods described in this document. Briefly, and among other things, the device 800 includes a processor configured to map substantially all content accessed by applications of the device 800, where the content is mapped using Uniform Resource Identifiers (URIs).

In more detail, the hardware environment of the device 800 includes a touchscreen display 801 for displaying text, images, and video to a user; a pointing device 804 for pointing, selecting, and adjusting objects displayed on the display 801; an antenna 805; a network connection 806; a camera 807; a microphone 809; and a speaker 810. The device displays a virtual keyboard 802 on the display 801 for entering text data and user commands into the device 800. Although the device 800 shows an external antenna 805, the device 800 can include an internal antenna, which is not visible to the user.

The display 801 can display video, graphics, images, and text that make up the user interface for the software applications used by the device 800, and the operating system programs used to operate the device 800. Among the possible elements that may be displayed on the display 801 are a new mail indicator 811 that alerts a user to the presence of a new message; an active call indicator 812 that indicates that a telephone call is being received, placed, or is occurring; a data standard indicator 814 that indicates the data standard currently being used by the device 800 to transmit and receive data; a signal strength indicator 815 that indicates a measurement of the strength of a signal received by via the antenna 805, such as by using signal strength bars; a battery life indicator 816 that indicates a measurement of the remaining battery life; or a clock 817 that outputs the current time.

The display 801 may also show application icons representing various applications available to the user, such as a web browser application icon 819, a telephone application icon 820, a search application icon 821, a contacts application icon 822, a mapping application icon 824, an email application icon 825, or other application icons. In one example implementation, the display 801 is a quarter video graphics array (QVGA) thin film transistor (TFT) liquid crystal display (LCD), capable of 16-bit or better color. The display 801 can be a touchscreen display device. The keys displayed as part of the virtual keyboard 802 can change depending on the applications invoked on the device 800.

A user uses the virtual keyboard 802 to enter commands and data to operate and control the operating system and applications that request content from the device or that write content to the device. The keyboard 802 includes standard keyboard icons associated with alphanumeric characters, such as keys 826 and 827 that are associated with the alphanumeric characters "Q" and "W" when selected alone, or are associated with the characters "*" and "1" when pressed in combination with key 829.

In addition to keys traditionally associated with an alphanumeric keypad, the telephone 800 also includes physical special function keys, such as an establish call key 830 that causes a received call to be answered or a new call to be originated; a terminate call key 831 that causes the termination of an active call; a drop down menu key 832 that causes a menu to appear within the display 801; a backward navigation key 834 that causes a previously accessed network address to be accessed again; a favorites key 835 that causes an active web page to be placed in a bookmarks folder of favorite sites, or causes a bookmarks folder to appear; a home page key 836 that causes an application invoked on the device 800 to navigate to a predetermined network address; or other keys that provide for multiple-way navigation, application selection, and power and volume control. In some implementations, the physical special function keys are touch sensors.

The user uses the pointing device 804 to select and adjust graphics and text objects displayed on the display 801 as part of the interaction with and control of the device 800 and the applications invoked on the device 800. The pointing device 804 is any appropriate type of pointing device, and may be a joystick, a trackball, a touch-pad, a camera, a voice input device, a touchscreen device implemented in combination with the display 801, or any other input device.

The antenna 805, which can be an external antenna or an internal antenna, is a directional or omni-directional antenna used for the transmission and reception of radiofrequency (RF) signals that implement point-to-point radio communication, wireless local area network (LAN) communication, or location determination. The antenna 805 may facilitate point-to-point radio communication using the Specialized Mobile Radio (SMR), cellular, or Personal Communication Service (PCS) frequency bands, and may implement the transmission of data using any number or data standards. For example, the antenna 805 may allow data to be transmitted between the device 800 and a base station using technologies such as Wireless Broadband (WiBro), Worldwide Interoperability for Microwave ACCess (WiMAX), 3GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only) (EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile telephone System (D-AMPS), Integrated Digital Enhanced Network (IDEN), Global System for Mobile communications (GSM), DataTAC, Mobitex, Cellular Digital Packet Data (CDPD), Hicap, Advanced Mobile telephone System (AMPS), Nordic Mobile telephone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM9200A chipset with an QUALCOMM RTR8285 transceiver and PM9740 power management circuit.

The wireless or wired computer network connection 806 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 806 may connect to a LAN network, a corporate or government WAN network, the Internet, a telephone network, or other network. The network connection 806 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE FIREWIRE connector, a Universal Serial Bus (USB) connector (including a mini-B USB interface connector), a serial port connector, a parallel port connector, or other wired connector. In another implementation, the functions of the network connection 806 and the antenna 805 are integrated into a single component.

The camera 807 allows the device 800 to capture digital images, and may be a scanner, a digital still camera, a digital video camera, other digital input device. In one example implementation, the camera 807 is a 3 mega-pixel (MP) camera that utilizes a complementary metal-oxide semiconductor (CMOS).

The microphone 809 allows the device 800 to capture sound, and may be an omni-directional microphone, a unidirectional microphone, a bi-directional microphone, a shotgun microphone, or other type of apparatus that converts sound to an electrical signal. The microphone 809 may be used to capture sound generated by a user, for example when the user is speaking to another user during a telephone call via the device 800. Conversely, the speaker 810 allows the device to convert an electrical signal into sound, such as a voice from another user generated by a telephone application program, or a ring tone generated from a ring tone application program. Furthermore, although the device 800 is illustrated in FIG. 8 as a handheld device, in further implementations the device 800 may be a laptop, a workstation, a midrange computer, a mainframe, an embedded system, telephone, desktop PC, a tablet computer, a PDA, or other type of computing device. Device 800 can be an implementation of device 100.

Figure 9:
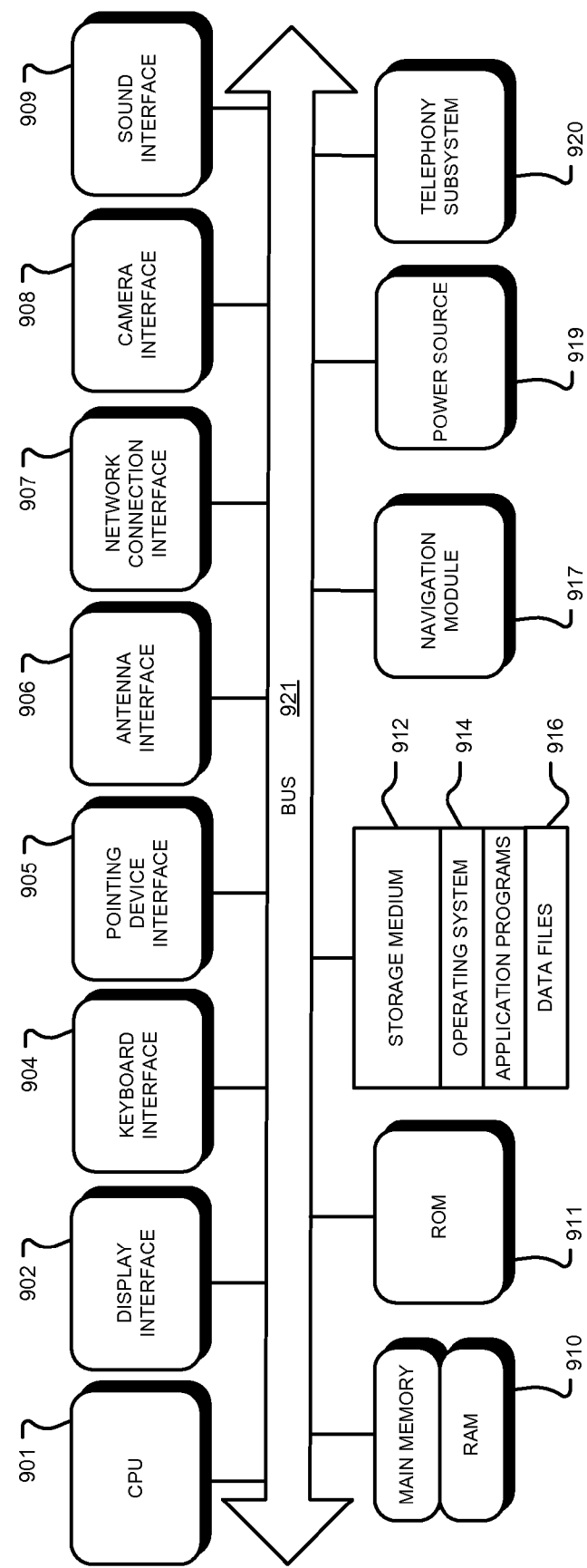
FIG. 9 is a block diagram illustrating an internal architecture of the devices described in this document.

FIG. 9 is a block diagram illustrating an internal architecture of the device 800 or the device 100. The architecture includes a central processing unit (CPU) 901 where the computer instructions that comprise an operating system or an application are processed; a display interface 902 that provides a communication interface and processing functions for rendering video, graphics, images, and texts on the display 901, provides a set of built-in controls (such as buttons, text and lists), supports diverse screen sizes, and receives signals indicating physical contact with the display; a keyboard interface 904 that provides a communication interface to the virtual keyboard 802 or a physical keyboard; a pointing device interface 905 that provides a communication interface to the pointing device 804; an antenna interface 906 that provides a communication interface to the antenna 805; a network connection interface 907 that provides a communication interface to a network over the computer network connection 806; a camera interface 908 that provides a communication interface and processing functions for capturing digital images from the camera 807; a sound interface 909 that provides a communication interface for converting sound into electrical signals using the microphone 809 and for converting electrical signals into sound using the speaker 810; a random access memory (RAM) 910 where computer instructions and data are stored in a volatile memory device for processing by the CPU 901; a read-only memory (ROM) 911 where invariant low-level systems code or data for basic system functions such as basic input and output (I/O), startup, or reception of keystrokes from the keyboard 802 are stored in a non-volatile memory device; a storage medium 912 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 914, application programs 915 (including, for example, a web browser application, a widget or gadget engine, and or other applications, as necessary) and data files 916 are stored; a navigation module 917 that provides a real-world or relative position or geographic location of the device 800; a power source 919 that provides an appropriate alternating current (AC) or direct current (DC) to power components; and a telephony subsystem 920 that allows the device 800 to transmit and receive sound over a telephone network. The constituent devices and the CPU 901 communicate with each other over a bus 921.

The CPU 901 can be one of a number of computer processors. In one arrangement, the computer CPU 901 is more than one processing unit. The RAM 910 interfaces with the computer bus 921 so as to provide quick RAM storage to the CPU 901 during the execution of software programs such as the operating system application programs, and device drivers. More specifically, the CPU 901 loads computer-executable process steps from the storage medium 912 or other media into a field of the RAM 910 in order to execute software programs. Data is stored in the RAM 910, where the data is accessed by the computer CPU 901 during execution. In one example configuration, the device 900 includes at least 128 MB of RAM, and 256 MB of flash memory.

The storage medium 912 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 800 to access computer-executable process steps, application programs and the like, stored on removable and non-removable memory media, to off-load data from the device 800, or to upload data onto the device 900.

A computer program product is tangibly embodied in storage medium 912, a machine-readable storage medium. The computer program product includes instructions that, when read by a machine, operate to cause a data processing apparatus to store image data in the mobile device. In some embodiments, the computer program product includes instructions that perform operations including mapping content stored on a device using URIs, receiving requests having URIs from applications (where the requests are received at a universal interface), and retrieving data from (or writing data to) the device using content providers that manage the data.

The operating system 914 may be a LINUX-based operating system such as the ANDROID mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 914 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON, FLASH LITE, or MICROSOFT .NET Compact, or another appropriate environment.

The device stores computer-executable code for the operating system 914, and the application programs 915 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 915 may also include a widget or gadget engine, such as a TAFRI widget engine, a MICROSOFT gadget engine such as the WINDOWS SIDEBAR gadget engine or the KAPSULES gadget engine, a YAHOO! widget engine such as the KONFABULTOR widget engine, the APPLE DASHBOARD widget engine, the GOOGLE gadget engine, the KLIPFOLIO widget engine, an OPERA widget engine, the WIDSETS widget engine, a proprietary widget or gadget engine, or other widget or gadget engine the provides host system software for a physically-inspired applet on a desktop.

Although it is possible to specify content using URIs and interact with the URIs via universal interface using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 917 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 917 may also be used to measure angular displacement, orientation, or velocity of the device 800, such as by using one or more accelerometers.

Figure 10:
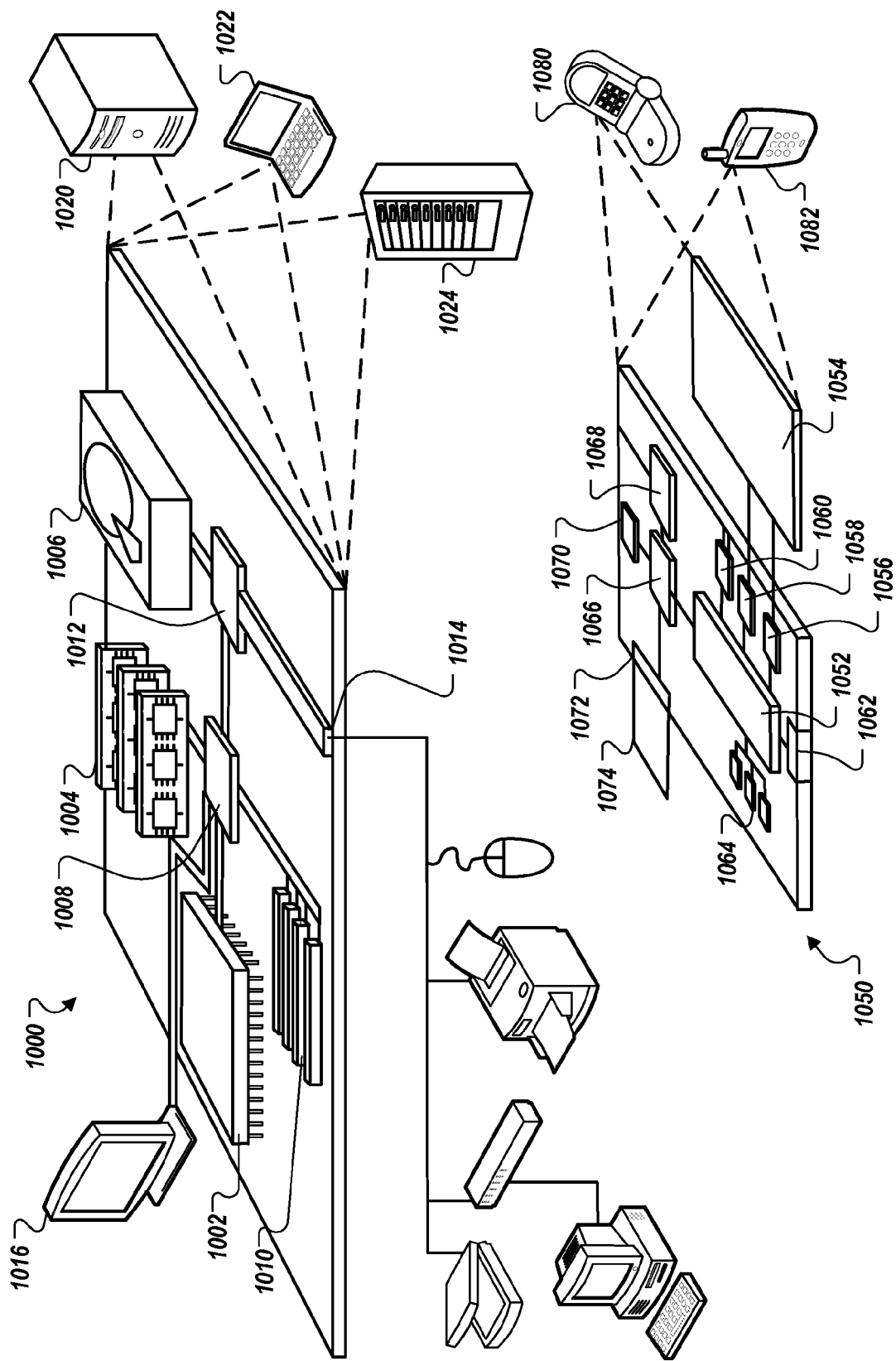
FIG. 10 is a block diagram of computing devices that may be used to implement the systems and methods described in this document, as either a client or as a server or plurality of servers.

FIG. 10 is a block diagram of computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. Additionally computing device 1000 or 1050 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. Additionally, the processor may be implemented using any of a number of architectures. For example, the processor 1052 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and computer storage medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for coordinating discrete user input components may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
   identifying a swiping action from a touch sensor button of a computing device to a touchscreen of the computing device, wherein:
   (i) the touchscreen includes a touch-sensitive overlay configured to detect user contact with the touchscreen and to distinguish among multiple different locations of user contact with the touchscreen, the touchscreen configured to output displays of different multiple-pixel graphics,
   (ii) the touch sensor button is distinct from the touch-sensitive overlay of the touchscreen, the touch sensor button is located outside of the touchscreen and is separated from the touchscreen by at least a portion of a housing of the computing device, the touch sensor button is configured to detect user contact with the touch sensor button but not to distinguish among multiple different locations of user contact with the touch sensor button, and the touch sensor button is not configured to output displays of different multiple-pixel graphics, and
   (iii) identifying the swiping action includes:
      determining, while the computing device is in a state that provides a first graphical display on the touchscreen, that the touch sensor button has been physically contacted by a user,
      determining that the physical contact with the touch sensor button has ended, and
      determining, within a predetermined time period of the end of the physical contact with the touch sensor button, that a swiping motion across the touchscreen has originated at a peripheral edge of the touchscreen, the swiping motion across the touchscreen completing the swiping action from the touch sensor button to the touchscreen; and
   in response to identifying the swiping action from the touch sensor button of the computing device to the touchscreen of the computing device, changing a display of the touchscreen based on the identified swiping action,
   wherein changing the display of the touchscreen based on the identified swiping action comprises invoking a predetermined computerized routine that:
   (i) is not otherwise invoked through a physical contact with the touch sensor button alone when the computing device is in the state that provides the first graphical display, and
   (ii) is also not otherwise invoked through a single physical user interaction with the touchscreen when the computing device is in the state that provides the first graphical display.

2. The method of claim 1, wherein identifying the swiping action from the touch sensor button to the touchscreen includes determining that a numerically positive delay between the end of the physical contact with the touch sensor button and an origination of the swiping motion across the touchscreen has occurred.

3. The method of claim 1, wherein the single physical user interaction with the touchscreen includes a tap, dragging motion across the touchscreen, or a multi-touch user interaction.

4. The method of claim 1, wherein identifying the swiping action from the touch sensor button to the touchscreen further comprises:
   determining a location of a point of release from the touchscreen of the swiping motion across the touchscreen; and
   wherein the invocation of the predetermined computerized routine is dependent on the location of the point of release.

5. The method of claim 1, wherein identifying the swiping action from the touch sensor button to the touchscreen further comprises:

determining that a termination point of the swiping motion across the touchscreen is at a peripheral edge of the touchscreen;

determining that the termination point is within a particular region from among multiple regions along the peripheral edges of the touchscreen; and wherein changing the display of the touchscreen based on the identified swiping action comprises changing the computing device to a state that provides a second graphical display on the touchscreen, the second graphical display determined as a result of the termination point being within the particular region in distinction to other regions among the multiple regions.

6. The method of claim 1, further comprising, in response to identifying the swiping action from the touch sensor button and to the touchscreen, placing the computing device into a state in which a location of touchscreen contact from the swiping motion across the touchscreen triggers audio cues that are not otherwise triggered through a single user interaction with the touchscreen when the touchscreen provides the first graphical display.

7. The method of claim 1, further comprising:
determining a trajectory of the swiping motion across the touchscreen; and
determining, based on the determined trajectory of the swiping motion, that the touch sensor button is an apparent initiation location of the swiping motion, the apparent initiation location external to the touchscreen; and
wherein the display of the touchscreen in changed in response to determining that the touch sensor button is the apparent initiation location of the swiping motion.

8. The method of claim 1, wherein the swiping motion across the touchscreen is a dragging motion that is independent of interaction with the touch sensor button.

9. The method of claim 1, wherein the touch sensor button is configured to be placed in only one of two states that correspond to a contacted state and a not contacted state, and wherein the touchscreen is configured to be placed in multiple states that depend on the particular locations of user contact with the touchscreen.

10. The method of claim 1, wherein changing the display of the touchscreen based on the identified swiping action comprises displaying a graphical element on the touchscreen that follows the swiping motion across the touchscreen.

11. A computing device comprising:
a housing;
a touchscreen display coupled to the housing so that a display surface of the touchscreen display is visible to a user of the computing device, wherein the touchscreen display includes a touch-sensitive overlay that is operable to detect user contact with the display surface of the touchscreen display and to distinguish among multiple different locations of user contact with the display surface of the touchscreen display, and wherein the touchscreen display is configured to output displays of different multiple-pixel graphics;
a touch sensor button of the computing device that is distinct from the touch-sensitive overlay of the touchscreen display, wherein the touch sensor button is located outside of the touchscreen display and is separated from the touchscreen display by at least a portion of the housing of the computing device, wherein the touch sensor button is configured to detect user contact with the touch sensor button but not to distinguish among multiple different locations of user contact with the touch sensor button, and wherein the touch sensor button is not configured to output displays of different multiple-pixel graphics;

one or more processors included in the housing; and
a computer-readable medium connected to the one or more processors and having instructions stored thereon which, when executed by the one or more processors, cause the one or more processors to perform operations comprising:
determining, while the computing device is in a state that provides a graphical display on the touchscreen display, that the touch sensor button has been physically contacted by a user;
determining that contact with the display surface of the touchscreen display at a peripheral edge of the display surface of the touchscreen display has occurred;
determining that the physical contact with the touch sensor button has ended within a predetermined period of time following the determination that contact with the display surface of the touchscreen display has occurred; and
changing, in response to determining that the physical contact with the touch sensor button has ended within the predetermined period of time following the determination that contact with the display surface of the touchscreen display has occurred, the graphical display of the touchscreen display,
wherein changing the graphical display of the touchscreen display comprises invoking a predetermined computerized routine that:
(i) is not otherwise invoked through a physical contact with the touch sensor button alone when the computing device is in the state that provides the graphical display on the touchscreen display, and
(ii) is also not otherwise invoked through a single physical user interaction with the touchscreen when the touchscreen is in the state that provides the graphical display on the touchscreen display.

12. The computing device of claim 11, wherein determining that contact with the display surface of the touchscreen display has occurred includes determining that the contact is with a portion of the display surface of the touchscreen display that is along the peripheral edge of the touchscreen display, the peripheral edge of the touchscreen display being adjacent to the touch sensor button.

13. The computing device of claim 11, wherein the operations further comprise:
determining a location of a point of release of the contact of the display surface of the touchscreen display, the point of release terminating a swiping motion that originated with the contact with the display surface of the touchscreen display;
wherein changing the graphical display of the touchscreen display comprises invoking a predetermined computerized routine that is dependent on the location of the point of release being within a particular region of the touchscreen from among multiple regions of the touchscreen, the multiple regions of the touchscreen associated with different predetermined computerized routines.

14. The computing device of claim 11, wherein the touch sensor button is a capacitive touch switch.

15. The computing device of claim 11, wherein the touch sensor button is a resistive touch switch.

16. The computing device of claim 11, wherein the touch sensor button is a physical touch switch.

17. The computing device of claim 10, further comprising:
a backlight to illuminate a region of the computing device associated with the touch sensor button;
wherein the operations further comprise:
- in response to: (i) determining that the touch sensor button has been physically contacted, (ii) determining that the physical contact with the touch sensor button has ended, or (iii) determining that contact with the display surface of the touchscreen display has occurred, turning the backlight on; and
- turning the backlight off upon determining that a release of the contact with the display surface of the touchscreen display has occurred.

18. A computing device comprising:
a housing;
a touch sensor button coupled to the housing so that a user may physically contact and activate the touch sensor button, the touch sensor button being configured to detect user contact with the touch sensor button but not to distinguish among multiple different locations of user contact with the touch sensor button, the touch sensor button not being configured to output displays of different multiple-pixel graphics;
a touchscreen display coupled to the housing so that a display surface of the touchscreen is visible to a user, wherein the touchscreen display includes a touch-sensitive overlay that is distinct from the touch sensor button, and wherein the touchscreen display is configured to detect user contact with the display surface of the touchscreen display and to distinguish among multiple different locations of user contact with the display surface of the touchscreen display, the touchscreen display configured to output displays of different multiple-pixel graphics;
one or more processors coupled to the housing;
means for (i) identifying a swiping user input that includes user interaction with the touch sensor button and the touchscreen display and for (ii) invoking a predetermined computerized routine that modifies a graphical display of the touchscreen display in response to the identification of the swiping user input,
wherein the touch sensor button is located outside of the touchscreen display and is separated from the touchscreen display by at least a portion of the housing of the computing device,
wherein the predetermined computerized routine that modifies the graphical display of the touchscreen display:
(i) is not otherwise invoked through a physical contact with the touch sensor button alone, and
(ii) is also not otherwise invoked through a single physical user interaction with the touchscreen display.

19. A computer storage medium encoded with instructions that when executed by data processing apparatus cause the data processing apparatus to perform operations, the operations comprising:
identifying a swiping action from a touchscreen display to a touch sensor button of a computing device, the identification of the swiping action including:
- determining, when the computing device is in a state that provides a first graphical display, a dragging across a surface of the touchscreen display that terminates at a peripheral edge of the touchscreen; and
- determining, within a predetermined time window that includes time after the termination of the lateral motion, that the touch sensor button has been physically contacted by a user; and in response to identifying the swiping action from the touchscreen display to the touch sensor button of the computing device, changing a display of the touchscreen display based on the identified swiping action,
wherein the touchscreen display includes a touch-sensitive overlay that is configured to detect user contact with the surface of the touchscreen display and to distinguish among multiple different locations of user contact with the surface of the touchscreen display, the touchscreen display configured to output displays of different multiple-pixel graphics,
wherein the touch sensor button is distinct from the touch-sensitive overlay of the touchscreen display, the touch sensor button being located outside of the touchscreen display and being separated from the touchscreen display by at least a portion of a housing of the computing device, the touch sensor button being configured to detect user contact with the touch sensor button but not to distinguish among multiple different locations of user contact with the touch sensor button, the touch sensor button not being configured to output displays of different multiple-pixel graphics, and
wherein changing the display of the touchscreen display based on the identified swiping action comprises invoking a predetermined computerized routine that:
(i) is not otherwise invoked through a physical contact with the touch sensor button alone when the computing device is in the state that provides the first graphical display, and
(ii) is also not otherwise invoked through a single physical user interaction with the touchscreen display when the computing device is in the state that provides the first graphical display.

\* \* \* \* \*